US008884738B2

(12) United States Patent
Spangenberg et al.

(10) Patent No.: US 8,884,738 B2
(45) Date of Patent: Nov. 11, 2014

(54) IDENTIFYING AND/OR LOCKING SYSTEM FOR IDENTIFYING AND/OR UNBLOCKING A TECHNICAL SYSTEM, AND METHOD FOR THE OPERATION THEREOF

(75) Inventors: Philipp Paul Spangenberg, Garching (DE); Markus Michael Weitzel, Höhenkirchen (DE)

(73) Assignee: baimos technologies GmbH, Garching (DE)

( * ) Notice: Subject to any disclaimer, the term of this patent is extended or adjusted under 35 U.S.C. 154(b) by 1169 days.

(21) Appl. No.: 11/996,248

(22) PCT Filed: Jul. 19, 2006

(86) PCT No.: PCT/DE2006/001278
§ 371 (c)(1),
(2), (4) Date: Jul. 23, 2008

(87) PCT Pub. No.: WO2007/009453
PCT Pub. Date: Jan. 25, 2007

(65) Prior Publication Data
US 2009/0251279 A1    Oct. 8, 2009

(30) Foreign Application Priority Data

Jul. 19, 2005   (DE) .......................... 10 2005 033 628
Jul. 20, 2005   (DE) .......................... 10 2005 034 477

(51) Int. Cl.
*G05B 19/00*   (2006.01)
*B60R 25/20*   (2013.01)
*H04W 12/12*   (2009.01)

(52) U.S. Cl.
CPC ....... *B60R 25/2018* (2013.01); *B60R 2325/202* (2013.01); *B60R 2325/101* (2013.01); *H04W 12/12* (2013.01); *H01L 63/0846* (2013.01); *B60R 2325/205* (2013.01)
USPC ........... 340/5.2; 340/5.61; 340/5.28; 340/5.7; 340/5.8; 455/419; 455/420

(58) Field of Classification Search
CPC ..................... B60R 25/2018; H04L 63/0846
USPC ........ 340/5.2–5.74; 455/419, 420, 41.2, 41.3; 70/256–257
See application file for complete search history.

(56) References Cited

U.S. PATENT DOCUMENTS 6,072,402 A * 6/2000 Kniffin et al. ............... 340/5.28
6,161,005 A * 12/2000 Pinzon ......................... 455/403

(Continued)

FOREIGN PATENT DOCUMENTS

| DE | 101 42 967 | 3/2003 |
| DE | 102 37 831 | 2/2004 |
| EP | 0 913 979 | 5/1999 |

OTHER PUBLICATIONS

International Search Report for corresponding Application No. PCT/DE2006/001278 mailed Feb. 9, 2007.

*Primary Examiner* — Steven Lim
*Assistant Examiner* — Omeed Alizada
(74) *Attorney, Agent, or Firm* — Renner, Otto, Boisselle & Sklar, LLP

(57) ABSTRACT

The invention relates to an identifying and/or locking system for identifying and/or unblocking a technical system comprising at least one controlling receiver unit which executes at least one control function in accordance with a received signal, said technical system further comprising a mobile transmitter unit suitable for transmitting a signal that causes the controlling receiver unit to execute the control function. The controlling receiver unit is provided with means for testing whether a received signal is to trigger execution of a control function while the mobile transmitter unit is fitted with means which allow the signal that is to be transmitted to the controlling receiver unit to be defined, modified, and stored. Such an inventive system makes it possible especially to digitally transmit and temporally limit keys.

16 Claims, 4 Drawing Sheets

(56) References Cited

U.S. PATENT DOCUMENTS

| | | | |
|---|---|---|---|
| 6,799,272 B1 * | 9/2004 | Urata | 713/171 |
| 7,606,558 B2 * | 10/2009 | Despain et al. | 455/410 |
| 7,672,666 B2 * | 3/2010 | Hasan et al. | 455/420 |
| 2002/0146999 A1 * | 10/2002 | Witte | 455/345 |
| 2003/0193390 A1 * | 10/2003 | Muramatsu | 340/426.13 |

* cited by examiner

IDENTIFYING AND/OR LOCKING SYSTEM FOR IDENTIFYING AND/OR UNBLOCKING A TECHNICAL SYSTEM, AND METHOD FOR THE OPERATION THEREOF

The invention relates to an identifying and/or locking system, in the following referred to in short as identification system, on the basis of a transmission of preferably digital data, which is verified for identification by a receiving unit. Such systems could be used preferably for the organization of access and usage rights in connection with technical systems, especially for the operation of motorcars. Identification systems in the meaning of the invention comprise therefore both systems for coordinating the access to spatially divided areas and also systems for unblocking or blocking of technical functions.

In addition to common access and locking systems, in which an access and usage right follows necessarily from the possession of a key, which allows the access in combination with a unit functioning as a lock, different identification and locking systems have established themselves, which are based on an electronic and/or optical data transmission. The data set to be transmitted is stored on a storage unit and is recalled actively or passively. The storage unit with the stored data set takes over essentially the function of a conventional key. Solely the identification of the key is not realized based on geometric features, rather through a verification of the transmitted data.

In connection with motorcars so called radio key systems have established themselves, which partially complement conventional keys and essentially serve to fulfilling comfort functions, in that the motorcar is already prepared for the operation and respectively opened if the alleged or real authorized person is approaching, before the key comes in contact with a unit acting as a lock.

In addition, there exist already keyless entry/go systems, which function completely without mechanical keys. In both cases a system for unlocking of locked doors comprises a passive receiver in motorcar and an active transmitter at one electronic door opener carried by the driver, which communicates via radio or via optical data transmission with the receiver in the motorcar. During this communication usually a query protocol is processed, which comprises the transmission of a code from transmitter to receiver and a comparison of this code with a code stored in the motorcar. On correspondence of the transmitted code with the stored code it is concluded that the person carrying the transmitter has the access and usage right and the motorcar is unlocked.

Such systems have a series of disadvantages. Because of the permanent connection of the storage unit with a transmitter and possibly with a conventional key there are limits set to miniaturization. In addition, because of the physical connection, respectively coupling of the components, a simple and fast transmission of the key in digital ways is impossible.

The one time storage of the data set to be transmitted in the storage unit empowers oftentimes an owner independently from his real authorization to successfully use the systems secured in this way, for example for unauthorized use respectively theft of motorcars. The wireless data transmission is in addition especially for radio based systems always connected with the danger of an abusive recording of the transmitted data in the proximity of the used identification system. Since this goes often unnoticed, no measures are taken to counteract an abusive use of the access code. In this way working "duplicate keys" for keyless entry/go systems can therefore be realized, of which proliferation cannot be influenced. In such cases a replacement of the data set to be transmitted is necessary, which is partly relatively expensive. Likewise it is not possible to limit such a key in its temporal validity, since an update of the validity interval would involve as well a disproportionately high effort.

The problem of the present invention consists in providing an identification system, which avoids the disadvantages of the prior art. It should be usable especially in access and locking systems and should characterize itself by an improved protection against abusive use.

The problem is solved by an identification system with the features of claim 1. Advantageous embodiments of the system according to the invention are found in the claims 2 to 12. Claim 13 concerns a method for operating an identification system according to the invention and the claims 14 and 15 concern an advantageous embodiment of the method.

The invention consists essentially in an identification system for authorization-dependent usage of a technical system, which comprises at least one control receiving unit, which executes at least one control function depending on a received signal and which comprises at least a mobile transmission unit, which is operable for transmitting a signal which triggers the control receiving unit for executing the control function, whereby the control receiving unit has means to verify whether a received signal should trigger the execution of a control function and the mobile transmission unit has means which enable a setting, change and storage of the signal to be transmitted to the control receiving unit.

In an advantageous way the mobile transmission unit comprises means for receiving signals based on which a setting, change and storage of the signals to be transmitted to the control receiving unit can be realized. The setting, change and storage of the signals to be transmitted to the control receiving unit can be done at any time and repeatedly. In this way the signals to be transmitted can be modified quickly via radio and without a big effort to suit changing conditions.

In an advantageous way the mobile transmission unit is part of a mobile phone, a PDA (Personal Digital Assistant), a smart phone or a similar device. In this way, the entire functional capabilities of such devices can be used at the transmission of the signals.

An advantageous application of the invention results when the control receiving unit is integrated in a motorcar and at least one control function must be executed for being able to start the motorcar. For example, the control function executed by the control receiving unit can be an unlocking or locking of the motorcar doors, an unblocking or blocking of the ignition lock, an unblocking or blocking of a steering wheel lock, an unblocking or blocking of an anti-theft device and/or an unblocking or blocking of a motor control device. In this way the system according to the invention becomes a powerful keyless entry/go system.

A high security against abusive use results when the signal transmitted from the mobile transmission unit to the control receiving unit contains a code, which can be used for the authentication of the transmitted signal. Only on successful authentication the control receiving unit uses the received information for executing a control function, which can consist in the already described unblocking of a certain system of a motorcar. On unsuccessful authentication no unblocking occurs and the motorcar can not be started.

The transmitted signal respectively the mobile transmission unit transmitting this signal assumes therefore the function of a preferably digital, electronic key.

The system according to the invention unfolds its full capability if a central computing unit is comprised, which determines the signals to be sent to the control receiving unit and sends them to the mobile transmission unit, and the mobile transmission unit has means for receiving and storing the signals sent from the central computing unit. Especially mobile phones are suitable for this purpose. In an advantageous way the signal sent from the central computing unit contains a digital data set. This data set can comprise several encrypted areas, which can be decrypted in the control receiving unit and/or in the mobile transmission unit. As an example, this is presented for the opening of a motorcar. A digital key is generated on a server, i.e. a central computing unit, transmitted to a mobile transmission unit of a mobile phone and stored thereon. On the mobile phone the digital key is partially decrypted and fully or partially, i.e. still partially encrypted, transmitted to a control device in the motorcar, i.e. to a control receiving unit. The control device decrypts the still encrypted transmitted part of the digital key and executes based thereon actions, which lead to opening of the doors of the motorcar.

It is especially advantageous when the signal transmitted from the mobile transmission unit contains information about a time-dependent validity of the transmitted data, from which the execution of a control function can only then be derived, when the transmission of the signal transmitted from the mobile transmission unit takes place in a valid time window. In this way identification systems with especially high security standards can be realized. Digital keys transmitted once, lose automatically their validity after a pre-determined time. With this also the risks connected to the loss of a mobile transmission unit, for example, after the loss of the mobile phone are reduced to a large extent. Data intercepted in an unauthorized way, which were transmitted from the mobile transmission unit, also lose after a pre-determined time their value as key replacement. Similarly it is possible to transmit keys which lose their validity already after a one-time application.

It is especially advantageous, when there is the possibility to cancel the validity of an existing digital key, as for example by deleting it. In this way a system according to the invention with a significantly improved security standard can be realized, since the perils arising by theft of a component belonging to the system can be reduced also after the event.

In a further advantageous embodiment of a system according to the invention, there are means provided which allow incorporating information in the signal to be transmitted which relate to driver specific settings to the motorcar. Depending on the degree of automation and extra equipment, information concerning preferred navigation destinations, radio settings, seat settings, mirror settings and/or settings of the air conditioning can be stored and/or included in the signal transmitted to the control receiving unit.

In an advantageous way, the control receiving unit has means for transmitting data to the mobile transmission unit and/or the central computing unit. In this case, the discussed settings at the motorcar can be read out and included later in a signal transmitted from the mobile transmission unit. For this purpose the data relating to these settings can be stored or modified on the central computing unit or on the mobile transmission unit. Alternatively, such data can be created on the central computing unit or on the mobile transmission unit without having been previously read out.

The invention consists as well in a method for operating an identification and/or locking system for identifying and/or unblocking a technical system, which comprises at least one control receiving unit, which can execute at least one control function depending on a received signal, and which comprises at least one mobile transmission unit, wherein the control receiving unit comprises means for verifying whether a received signal should trigger the execution of a control function and the mobile transmission unit has means, which enable a setting, change and storage of the signal to be transmitted to the control receiving unit, wherein a digital key is created by a central computing unit, a connection is set up between the central computing unit and the mobile transmission unit, a transmission of the digital key from the central computing unit to the mobile transmission unit is realized, a connection between the mobile transmission unit and the control receiving unit is set up, a transmission of the digital key from the mobile transmission unit to the control receiving unit is realized, and at least one control function is executed by the control receiving unit, once the digital key has passed at least a verification of one criterion. The criterion to be verified can relate, for example, to a limited or unlimited validity of a digital key, an authentication of a mobile device including its user as well as a verification of the validity of a certain combination of a mobile device with a control receiving unit.

In addition, it is advantageous when the control receiving unit comprises transmitting means, i.e. on both sides transmission and receiving units are available. In this way a secure bidirectional communication can be set up between the transmitting and receiving units, wherein on the side of the mobile device and on the side of the control receiving unit at the object be protected identification units can be used respectively.

The use of a system according to the invention enables a series of deployment options. So actions can be automatically or manually triggered. The triggering can happen one or several times as soon as a connection exists, when it does not exist any more or based on other activating events.

Used digital keys can be valid for a limited or unlimited period of time and the digital key can be encrypted with at least one identification feature, which can be unambiguously attributed to the object to be protected, so that the digital key can be used only in connection with this object.

The invention is explained in more detail based on an embodiment. The corresponding figures show:

Figure 1:
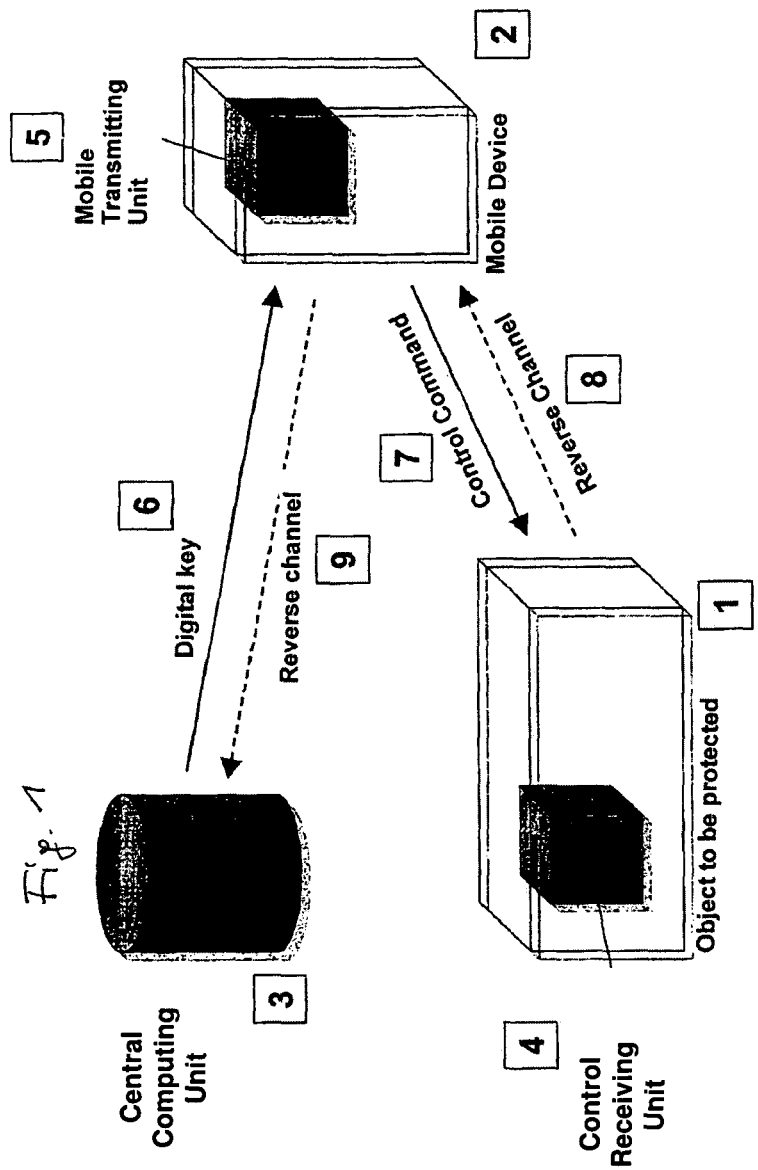
FIG. 1 is a block diagram of the basic components of a locking system realized according to the invention.

FIG. 1 shows a block diagram of the basic components of an identification system realized according to the invention for protecting an object 1 to be protected. The system comprises a mobile device 2, a central computing unit 3 and a control receiving unit 4 assigned to the object 1 to be protected. The mobile device 2 comprises a mobile transmission unit 5. Between the central computing unit 3 and the mobile transmission unit 5 a connection 6 can be set up enabling transmission of data, i.e. for example a digital key, from the central computing unit 3 to the mobile device 2. This connection 6 can be wireless or wired. Equally, between the mobile transmission unit 5 and the control receiving unit 4 a connection 7 can be set up for enabling transmission of data, i.e. for example a digital key or parts thereof or a control command, from the mobile device 2 to the object 1 to be protected. This connection 7 is realized wireless or wired between the mobile transmission unit 5 of the mobile device 2 and the control receiving unit 4 of the object 1 to be protected. In an advantageous way the control receiving unit 4 comprises transmission means and the mobile transmission unit 5 comprises receiving means for being able to set up bidirectionally the connection 7 between the mobile transmission unit 5 and the control receiving unit 4. The reverse channel 8 available as a result thereof, can be used for increasing the security of the connection. For the same reason it is advantageous, when the connection 6 between the mobile transmission unit 5 and a central computing unit 3 is set up bidirectionally. The channel 9 available as a result thereof can be used for increasing the security of this connection.

The presented system can be used for example in connection with motorcars. A motorcar comprises different systems, which must be enabled. Among these are the doors of the motorcar, the ignition lock, a steering wheel lock, an anti-theft system and a motor control device. The unblocking of these systems is realized via a control receiving unit 4 integrated in the motorcar, when this receives a signal whose verification shows that the unblocking of the named systems should occur. Without unblocking of these systems an operation of the motorcar is impossible. The verification of the signal comprises the authentication of the transmitted signal including a time-limited validity. If the signal cannot be authenticated or if its validity period has elapsed, there is no further activity of the control receiving unit 4.

The transmission of the signal to the control receiving unit 4 is realized via a mobile transmission unit 5, especially a Bluetooth chip in a correspondingly constructed mobile phone. The system according to the invention comprises then at least a mobile transmission unit 5, with which help the user gains access to the motorcar. Differently from conventional locking systems, the mobile transmission unit 5 comprises in the present example means for receiving signals, through which a setting, change and storage of the signals to be transmitted to the control receiving unit 4 can be realized. These means are embodied primarily by the receiving unit and data storage of the mobile phone. Alternatively, other mobile phones can be incorporated in a system according to the invention.

The connection between the mobile transmission unit 5 of the mobile phone and the control receiving unit 4 in the motorcar occurs via a wireless connection technology such as Bluetooth, WLAN or others. For increasing the security, the transmission of the data via the wireless connection takes place in encrypted form. Alternatively, encoded signals are transmitted, which are very strongly encrypted corresponding to the state of the art.

After the mobile transmission unit 5 comes within the reach of the control receiving unit 4 the setup of a connection can be automatically started. Alternatively, the setup of this connection can be manually initiated.

The transmission of the data stored in the mobile transmission unit 5 (mobile phone) can be similarly automatically or manually initiated after a successful setup of the connection. If the mobile phone is removed from within the reach of the control receiving unit 4, an automatic deactivation of the system takes place. Alternatively, a deactivation can take place at any time via intervention of the user both at the mobile phone and also at control elements of the motorcar.

The transmitted signal contains digital information, which on one side serves to the authentication of the signal itself and on the other side represents instructions concerning the functions to be executed by the control receiving unit 4. If the received signal can be successfully authenticated, it follows the utilization of the remaining information contained in the transmitted signal. The motorcar is unblocked for operation.

Figure 4:
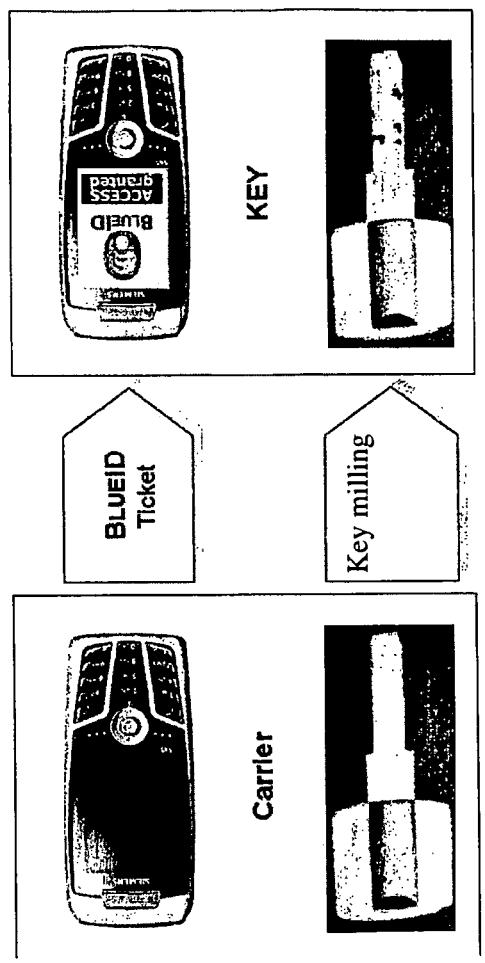
FIG. 4 is a representation of the system carrier-key.

In this way the used mobile phone works together with the signal to be transmitted as a digital key, wherein the stored data set specifies the key analogously to a conventional key milling pattern (Fräsung) and the mobile phone can be compared to some extent with a lock keyway. The digital key can be valid for a limited or unlimited period of time. A temporal limitation corresponds to an especially high security level. These dependencies are represented in FIG. 4.

The digital key can be realized on the mobile phone by storing a data set, which in the following is also referred to partially as a digital key. In the present example the data set is generated and transmitted to the mobile phone from a server, which embodies a central computing unit 3 in the sense of the invention. For this transmission wired or wireless systems are suitable, for example, GPRS, UMTS, MMS, SMS, WLAN or similar connection technologies. Alternatively, the digital key can also be downloaded directly with a used mobile device 2 from the server 3.

The individual parts of the digital key can be encrypted in different ways, wherein a simple separation between a data part which serves to the authentication of the signal and a data part which contains executable instructions is made possible.

This system according to the invention is characterized by a high versatility. The digital key can be encrypted with a number uniquely assigned (UIN) to the used mobile device, i.e. presently the mobile phone, so that the digital key can be used only in connection with this device. A similar association can take place between the digital key and a single motorcar, a fleet of motorcars, or a motorcar type.

For example, several digital keys, which are intended respectively for the use of a certain motorcar, can be stored on several mobile devices. In this way via a one-time key allocation a complicated authorization structure, for example, inside of companies can be regulated.

Furthermore, there are sensors comprised or means for reading out the position of different actuators, which make possible to gain information and to incorporate it in the signal to be transmitted, concerning driver specific settings at the motorcar. This information concerns preferred navigation destinations, radio settings, seat setting, mirror settings and settings of the air conditioning.

The versatility of the identification system according to the invention is made clear based on the following scenarios.

In the context of car rental a person wants to rent a car for a certain period of time. The car is ordered at a car rental. The decision for the use of a digital key is made. The digital key, also called ticket, is sent to a mobile device owned by the renting person, for example to his mobile phone. The person can use the mobile phone with the valid ticket as a car key.

The system is also usable for the organization of a fleet of motorcars. If a company wants to control its fleet management using digital keys, the keys are transmitted to the drivers on their mobile phones for the access to the required motorcars. The keys are valid for a certain period of time, expire subsequently and do not have to be brought back.

Applications are conceivable also in the private domain. If a private person wants to use a digital motorcar key for the private motorcar, he orders a ticket via the Internet. This is sent to a specified mobile phone and is available immediately.

Similarly applicable in a versatile way is the identification system according to the invention for an access control to buildings. If a person wants to rent, for example, for a certain period of time a hotel room, the room is ordered at the hotel. The decision for the use of a digital key is made. The digital key, also called ticket, is sent to a mobile device owned by the renting person, for example, to his mobile phone. The person can use the mobile phone with the valid ticket as a hotel and room key.

The system is also usable for the organization of access to company buildings. If a company wants to control its plant security via digital keys, digital keys are sent to the employees and/or visitors on their mobile phones for the access to certain rooms or buildings. The keys are valid for a certain period of time, expire subsequently and do not have to be brought back.

Also in the private domain are applications conceivable. If a private person wants to use a digital key for the house door for his own house, he orders via the Internet a ticket. This is sent to a designated mobile phone and is available immediately.

Figure 2:
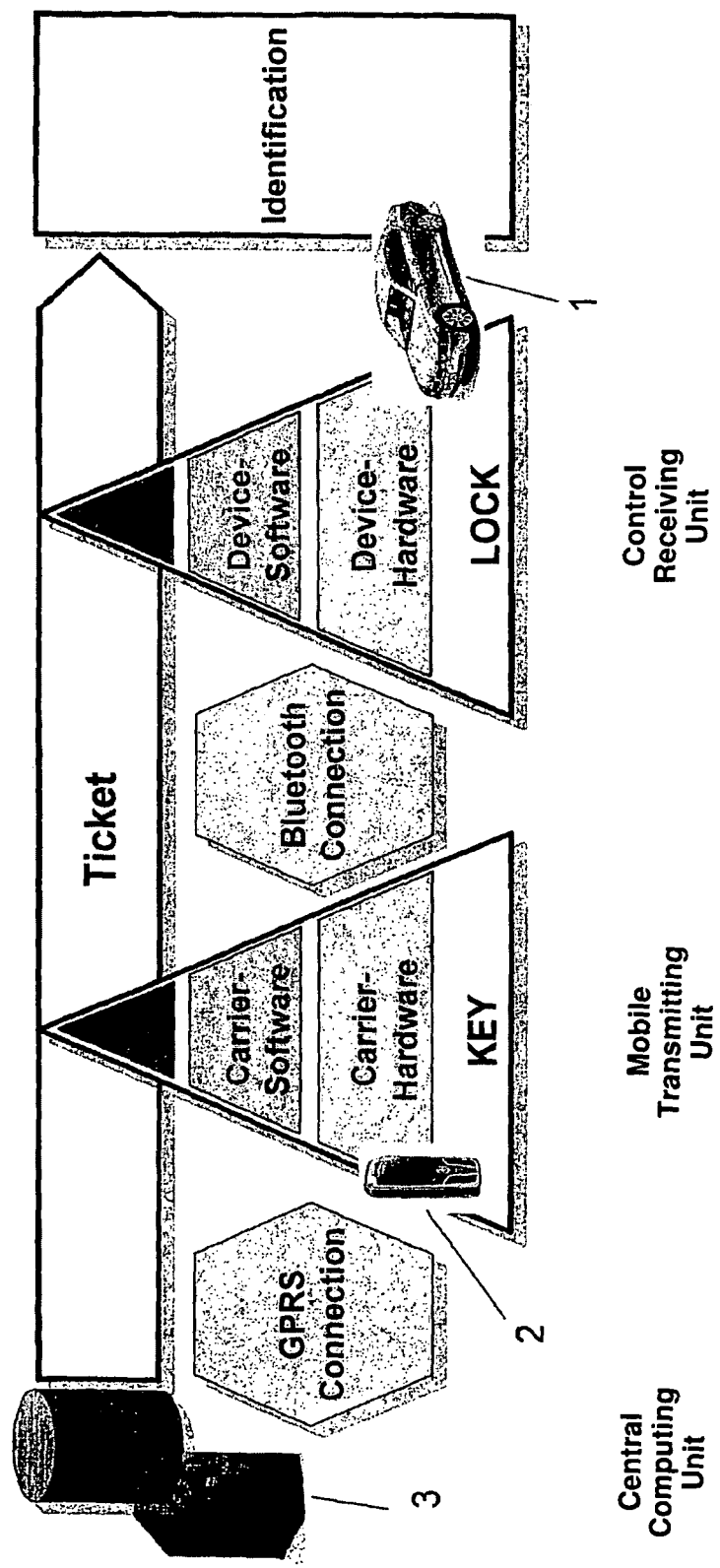
FIG. 2 is a schematic representation of the interaction of the components of a system according to the invention when using a mobile phone.

FIG. 2 shows a schematic representation of the interaction of the components of a system according to the invention when using a mobile phone. The goal of the interaction consists in controlling the access from a central computing unit 3 to an object 1 (motorcar) to be protected. This is arranged via the allocation of a digital key, also called ticket, and comprises a verification of identity. The access control is realized via the cooperation of the central computing unit with two further hardware components, a carrier hardware in form of a mobile device 2 and a device hardware in form of a control receiving unit connected to the object to be protected. The control receiving unit comprises corresponding device software and the mobile device has corresponding carrier software, in order to be able to communicate with one another via a Bluetooth connection. The device software is in addition capable to execute access providing actions. The carrier software regulates in addition the communication of the mobile device with the central computing unit, for example via a GPRS connection.

In the car scenario, the mobile phone of the driver represents the carrier component (carrier medium) and the car the device component (control medium). Both must comprise suitable software, for example BLUEID software, in order to process a ticket as KEY and LOCK, in this case, a BLUEID ticket. This delivers information which—via communication from KEY and LOCK, i.e. between the mobile device and the control receiving unit over a data interface—is translated in the functionality of the driver identification.

Figure 3:
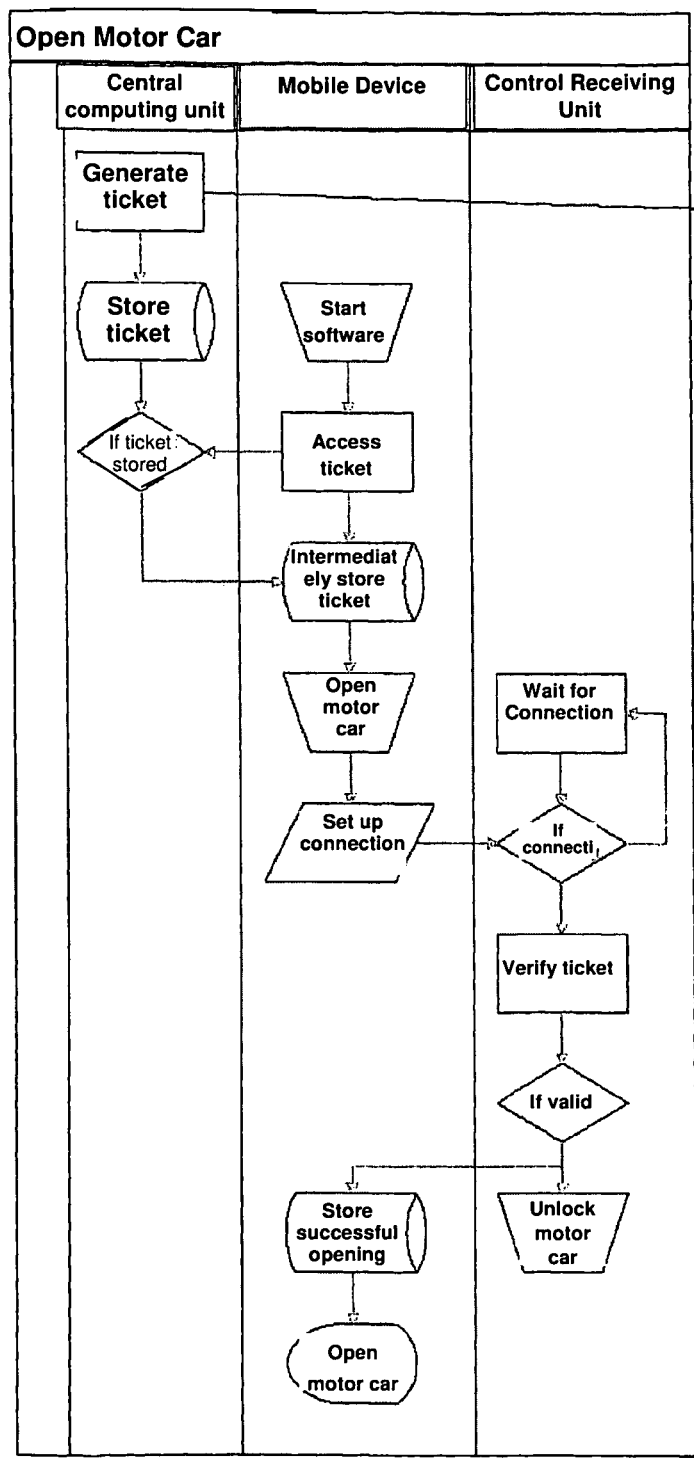
FIG. 3 is a flow chart of a program for carrying out the method according to the invention on the example of starting a motorcar.

FIG. 3 shows a flow chart of a program for the execution of a method according to the invention for the example of operating a motorcar. The flow chart is built on three columns, whereby each column is assigned to one of the hardware components as central computing unit, mobile device and control receiving unit. The communication across the borders of the columns takes place via the already described connections among the components, which are presently built bidirectionally.

Tickets or digital keys are created in the central computing unit and stored in a storage.

The mobile device, including the software stored thereon is started manually. A ticket is retrieved from the central computing unit and stored in a temporary storage on the mobile device. If an input takes place at the mobile device, which should cause the opening of the motorcar, a connection is set up to the control receiving unit in the motorcar.

If the software of the control receiving unit recognizes an existing connection to the mobile device, the ticket is verified and in the case of a valid ticket the motorcar is unlocked. At the same time a information is transmitted to the mobile device, from which the succeeded opening of the motorcar can be derived. At the mobile device a status is displayed, which indicates to the user of the mobile device the opening status of the motorcar.

REFERENCED NUMERALS 1. object to be protected
2. mobile device
3. central computing unit
4. control receiving unit
5. mobile transmission unit
6. connection
7. connection
8. reverse channel
9. reverse channel

The invention claimed is:

1. An identification and/or locking system for identifying and/or unblocking a technical system comprising:
   a central computing unit operable to generate and transmit a signal,
   at least one mobile transceiver unit operable to receive, store and modify the signal transmitted from the central computing unit and to retransmit wirelessly the modified signal, and
   at least one control receiving unit operable to receive wirelessly the signal transmitted from the mobile transceiver unit and to execute at least one control function based thereon, and
   wherein the signal comprises digital data operable to trigger the execution of the control function and a code which can be used by the control receiving unit to authenticate the mobile transceiver unit, thereby forming a digital key, and wherein the signal further comprises information concerning a time-dependent validity of the data for the execution of the control function.

2. A central computing unit configured to transmit a signal on a forward channel to a mobile transceiver unit operable to receive, store and modify the signal, wherein the signal comprises digital data operable to trigger the execution of a control function after being forwarded from the mobile transceiver unit to a control receiving unit and a code which can be used by the control receiving unit to authenticate the mobile transceiver unit, thereby forming a digital key, and wherein the signal further comprises information concerning a time-dependent validity of the data for the execution of the control function.

3. A central computing unit according to claim 2, configured to receive a signal from the mobile transceiver unit on a reverse channel.

4. A mobile transceiver unit configured to receive, store, modify a signal from a central computing unit and to transmit it on a forward channel wirelessly to a control receiving unit, wherein the signal comprises digital data operable to trigger the execution of a control function and a code which can be used by the control receiving unit to authenticate the mobile transceiver unit, thereby forming a digital key, and wherein the signal further comprises information concerning a time-dependent validity of the data for the execution of the control function.

5. A mobile transceiver unit according to claim 4, operable to receive a signal from the control receiving unit (4) on a first reverse channel.

6. A mobile transceiver unit according to claim 4, configured to transmit a signal to the central computing unit on a second reverse channel.

7. A control receiving unit configured to receive a signal, which is generated from a central computing unit and forwarded from a mobile transceiver unit operable to receive, store and modify the signal, and execute at least one control function depending thereon, wherein the signal comprises digital data, operable to trigger the execution of the control function and a code which can be used by the control receiving unit to authenticate the mobile transceiver unit, thereby forming a digital key, and wherein the signal further comprises information concerning a time-dependent validity of the data for the execution of the control function.

8. A control receiving unit according to claim 7, configured to transmit a signal to the mobile transceiver unit on a reverse channel.

9. A control receiving unit according to claim 7, configured for integration in a motorcar and wherein the control function of the control receiving unit is configured to open and/or start the motorcar and/or to set user specific settings.

10. A control receiving unit according to claim 9, wherein the executed control function is an unlocking and locking of the motorcar doors, an unblocking or blocking of the ignition lock, an unblocking or blocking of an anti-theft device and/or an unblocking or blocking of an engine control device.

11. A control receiving unit according to claim 10, wherein the execution of at least one control function causes a setting of individual settings at the motorcar.

12. A control receiving unit according to claim 7, configured for being integrated in a building and the control function of the control receiving unit is operable to allow access to the building.

13. A method for operating a central computing unit according to claim 2, comprising transmitting a signal on a forward channel to a mobile transceiver unit operable to receive, store and modify the signal, wherein the signal comprises digital data operable to trigger the execution of a control function after being forwarded from the mobile transceiver unit to a control receiving unit and a code which can be used by the control receiving unit to authenticate the mobile transceiver unit, thereby forming a digital key, and wherein the signal further comprises information concerning a time-dependent validity of the data for the execution of the control function.

14. A method for operating a transceiver unit according to claim 4, comprising receiving, storing and modifying a signal from a central computing unit, and transmitting it on a forward channel wirelessly to a control receiving unit, wherein the signal comprises digital data operable to trigger the execution of a control function and a code which can be used by the control receiving unit to authenticate the mobile transceiver unit, thereby forming a digital key, and wherein the signal further comprises information concerning a time-dependent validity of the data for the execution of the control function.

15. A method for operating a control receiving unit according to claim 7, comprising receiving a signal, which is generated from a central computing unit and forwarded from a mobile transceiver unit operable to receive, store and modify the signal, and executing at least one control function depending thereon, wherein the signal comprises digital data, operable to trigger the execution of the control function and a code which can be used by the control receiving unit to authenticate the mobile transceiver unit, thereby forming a digital key, and wherein the signal further comprises information concerning a time-dependent validity of the data for the execution of the control function.

16. A computer program embodied on a non-transitory computer readable medium for use in executing the method according to claim 13, the computer program when executed by a computer causing transmission of a signal on a forward channel to a mobile transceiver unit operable to receive, store and modify the signal, wherein the signal comprises digital data operable to trigger the execution of a control function after being forwarded from the mobile transceiver unit to a control receiving unit and a code which can be used by the control receiving unit to authenticate the mobile transceiver unit, thereby forming a digital key, and wherein the signal further comprises information concerning a time-dependent validity of the data for the execution of the control function.

\* \* \* \* \*

UNITED STATES PATENT AND TRADEMARK OFFICE
CERTIFICATE OF CORRECTION

PATENT NO. : 8,884,738 B2
APPLICATION NO. : 11/996248
DATED : November 11, 2014
INVENTOR(S) : Philipp Paul Spangenberg et al.

It is certified that error appears in the above-identified patent and that said Letters Patent is hereby corrected as shown below:

On the title page item (75), "Inventors: Philipp Paul Spangenberg, Garching (DE); Markus Michael Weitzel, Höhenkirchen (DE)" should read:
-- Inventors: Philipp Paul Spangenberg, Garching (DE); Markus Michael Weitzel, Höhenkirchen (DE); Robert Metzke, Traunstein (DE); Sebastian Wolf, München, (DE) --

Signed and Sealed this
Sixteenth Day of June, 2015

Michelle K. Lee
*Director of the United States Patent and Trademark Office*